Sept. 20, 1960  W. L. LEWIS  2,953,322
AIRBORNE VEHICLE WITH VARIABLE AREA SUSTENTATION MEANS
Filed May 21, 1954  2 Sheets-Sheet 1
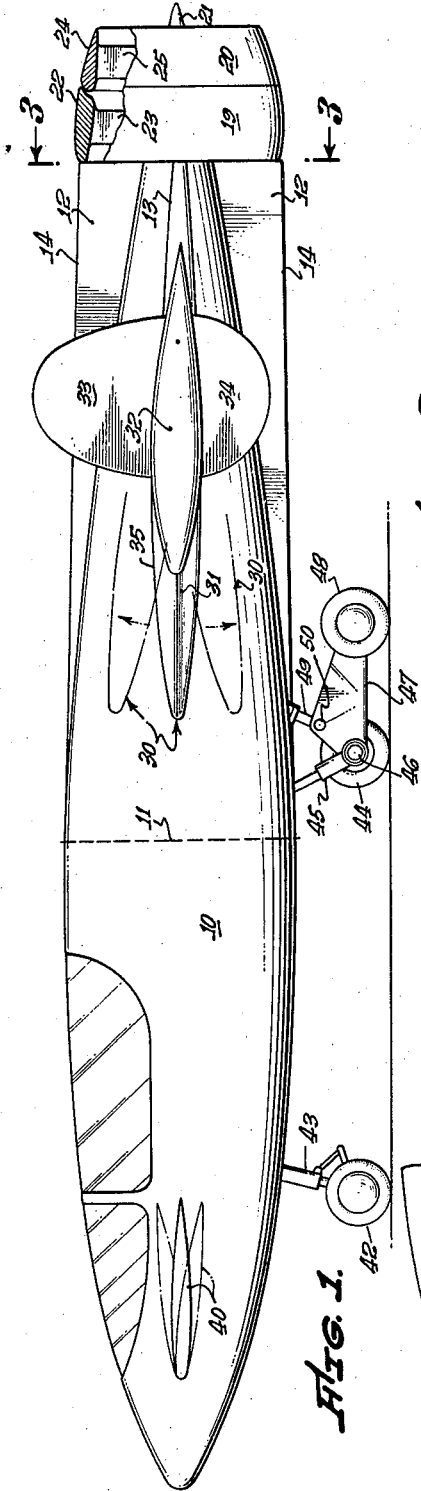
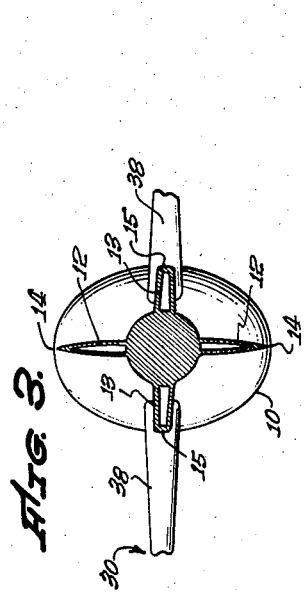
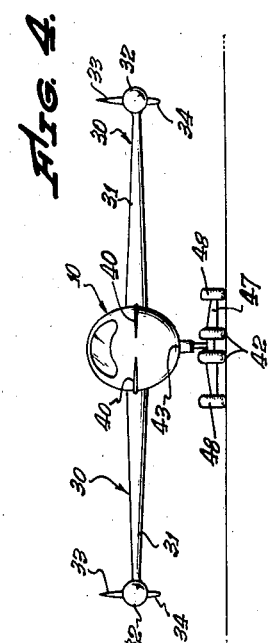
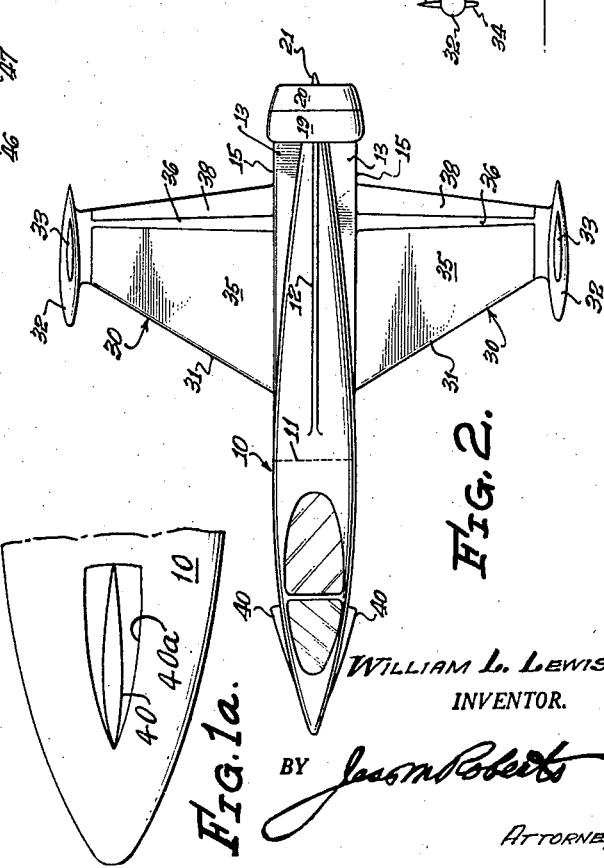
WILLIAM L. LEWIS,
INVENTOR.
BY *Jason Roberts*
ATTORNEY.

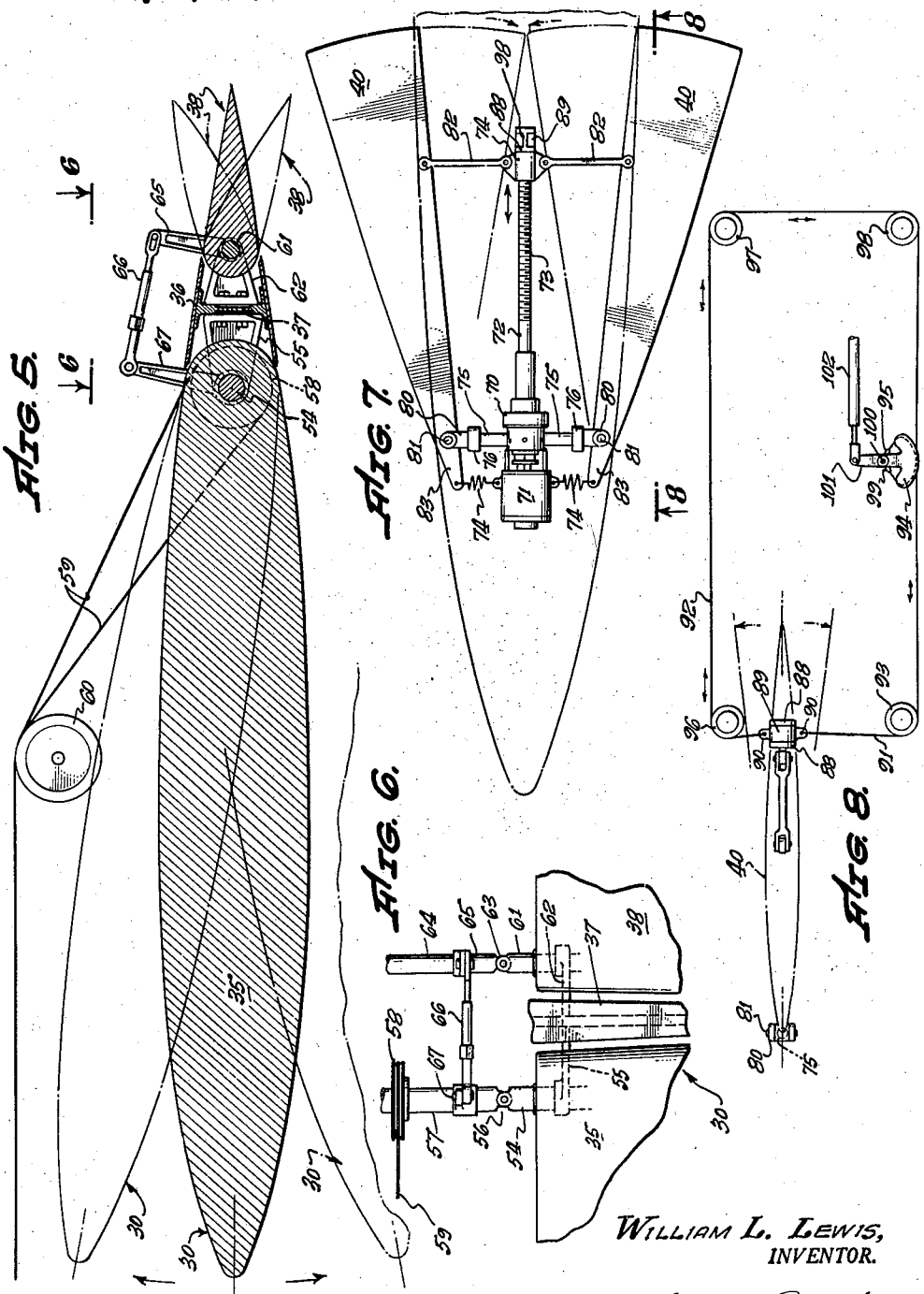

United States Patent Office 2,953,322
Patented Sept. 20, 1960

2,953,322

AIRBORNE VEHICLE WITH VARIABLE AREA SUSTENTATION MEANS

William L. Lewis, 2046 Chilton Drive, Glendale, Calif.

Filed May 21, 1954, Ser. No. 431,370

11 Claims. (Cl. 244—46)

My invention relates broadly to airborne vehicles including manned aircraft, robot aircraft, guided missiles, and the like, and is directed to certain improvements relating to the structure of such an aircraft, as well as to improvements relating to performance under various operating conditions. For the purpose of disclosure and to illustrate the principles involved, the embodiment of the invention elected for the present disclosure is a manned airplane. The description of this selected embodiment will provide adequate guidance for those skilled in the art who may have occasion to apply the same principles to other types of airborne craft for various specific purposes.

One of the broad objects of the invention is to achieve simplicity of construction and economy in structural weight. In this regard, the invention is characterized by the concept of eliminating parts by making them unnecessary. In seeking simplicity, a further end in mind is to simplify the operation of the airplane and to reduce the maintenance burden to the minimum. If minimum structure were the sole object and consideration, the answer would be found in some type of flying wing. The configuration of a flying wing, however, does not provide adequate cargo space and space for personnel in aircraft of transport dimensions and, moreover, resort to a flying wing configuration introduces special problems of stability and control.

The underlying concept of the invention is the combination of a perfectly streamlined body with aerodynamically efficient wing lifting surfaces and this basic concept is adhered to as closely as possible in taking into consideration the addition of a power plant and other necessary components that must be included in the final combination. One of the more advantageous simplifications in the mounting of the landing gear entirely on the body of the aircraft without involving the wing structure.

It is also a broad object of the invention to achieve a high degree of flexibility in the sense of providing an aircraft that is readily and effectively adaptable for supersonic flight condition, subsonic flight conditions and both take-off and landing conditions. Considerations with respect to drag vary widely among these conditions and the requirements that must be met for directional stability, maneuverability and efficient propulsion are more or less different for each of the conditions. In this regard the invention is characterized by minimum compromise in meeting the different requirements in the sense of avoiding the undesirable presence during one of the operating conditions of some aerodynamic factor of characteristic that is essential for another of the operating conditions. The ideal sought is to have a requisite factor or characteristic unique for one of the operating conditions appear only during that operating condition.

In general, this problem of minimum comprise is met largely by providing a combination of body and wing structure that is basically highly efficient for supersonic flight and by providing means for increasing the area of aerodynamic surfaces and for varying the angles of said surfaces for subsonic flight and by further providing means for increasing drag when required. In addition, as will be explained, special provisions are made for meeting the requirements of directional stability, maneuverability, and propulsion efficiency for each of the flight conditions.

For supersonic flight, the aircraft presents a pair of thin wings of low aspect ratio with swept-back leading edges and these wings are positioned rearward from the point of maximum cross-sectional dimension of the streamlined body. For subsonic flight, a pair of forward airfoils near the nose of the body is edged into the air stream to various degrees as required, these forward airfoils being completely retractible into the body configuration when not needed. Preferably, these forward airfoils are not only retractible to various degrees, but are also variable in angle relative to the body. The outstanding advantage of this arrangement is that the forward airfoils can be used for either positive or negative lift and therefore eliminate the necessity for the usual elevators that would handicap supersonic flight. Finally, for landing and take-off, the forward airfoils are adjustable to optimum angles for these conditions and the main wings are adjustable to especially effective configurations.

A further and important broad object of the invention is to provide increased safety with special reference to landing the airplane. A feature of the invention is that such safety is attained in large part by measures which enter into the attainment of the other broad objects of the invention.

The invention may be understood from the following detailed description considered with the accompanying drawings. The features and advantages of the invention will be apparent in the course of the description and will be discussed more fully after the description.

In the drawings, which are to be regarded as merely illustrative:

Fig. 1 is a side elevation of a selected embodiment of the invention elected by way of example for the purpose of the present disclosure;

Fig. 1a is a fragmentary side elevation showing how the forward airfoils may be mounted in opening in the airplane body;

Fig. 2 is a plan view of the airplane on a reduced scale;

Fig. 3 is a cross-section of the tapering rear end of the body taken along the line 3—3 of Fig. 1;

Fig. 4 is a front elevation of the airplane on a reduced scale;

Fig. 5 is a simplified diagrammatic sectional view of the main wing;

Fig. 6 is an enlarged fragmentary detail as seen along the line 6—6 of Fig. 5;

Fig. 7 is a simplified diagrammatic plan view of the forward retractible airfoils together with the associated control mechanism; and Fig. 8 is a similar diagrammatic view in side elevation of the forward airfoils together with the associated control mechanism as seen along the line 8—8 of Fig. 7.

The airplane illustrated by the drawings has a body, generally designated by numeral 10, that tapers longitudinally forwardly and rearwardly from an intermediate region of maximum cross-sectional dimension, this maximum region being indicated by the broken line 11 in Figs. 1 and 2. Rearward of the region of maximum cross-sectional dimension 11, the body configuration is modified by top and bottom vertical fins 12 and similar horizontal lateral fins 13 on the opposite sides of the body. These vertical and horizontal fins 12 and 13 progressively increase in depth in accord with the rearward taper of the body 10 with the outer edges 14 of the vertical fins (Fig. 1) conforming substantially to straight lines tangential to the longitudinal profile of the body and with the outer edges 15 of the horizontal fins 13 (Fig. 2) substantially tangential in the same manner. Thus, the vertical and lateral fins 12 and 13 give the rearwardly tapering portion of the body 10 a cruciform cross-sectional configuration as may be seen in Fig. 3.

A feature of the present embodiment of the invention is that the vertical fins 12 and the lateral horizontal fins 13 serve as rearwardly directed jet nozzles for jet propulsion of the aircraft at high altitudes and at the higher flight speeds. These four radial jet ports terminate immediately adjacent to two propeller assemblies generally designated 19 and 20, which are carried by a rearwardly projecting dual drive shaft 21.

The forward propeller assembly 19 has a generally cylindrical housing member 22 carried by a propeller 23 on the dual drive shaft 21 and, in like manner, the rearward propeller assembly 20 includes a housing member 24 carried by a propeller 25. The two propellers 23 and 25, with their associated housing members, are rotated in opposite directions by the dual drive shaft in a well known manner, and the propellers 23 and 25 are adapted for variable pitch. When the aircraft is propelled solely by jet blast from the four fins 12 and 13, the propellers 23 and 25 may be feathered. An important feature is that the two cylindrical housing members 22 and 25 form what may be termed a tunnel housing which has aerodynamic utility at both supersonic and subsonic speeds.

The main wings of the aircraft, each of which is generally designated 30 in Fig. 2, are positioned rearward of the region 11 of maximum cross-sectional dimension of the body 10 and are approximately on the same level as the longitudinal axis of the body instead of being positioned near the level of the under side of the body. The two wings 30 have swept-back forward edges 31 and are relatively thin wings of low aspect ratio. The tips of the wings may carry streamlined bodies 32 and each of the wing tips may also be provided with a pair of vertical fins comprising an upwardly extending fin 33 and a lower downwardly extending fin 34, both fins being in substantially the same longitudinal vertical plane.

In the present embodiment of the invention, each of the wings 30 has a relatively large panel 35 extending forward from the fixed structure 36 in the region of the wing spar 37 and has a narrower trailing panel 38 extending rearward from the wing spar. Both of these panels 35 and 38 are pivoted in the region of the wing spar 36 to rotate through a range of angles relative to the body 10. The two panels may be adjustable independently of each other, or may be synchronously adjustable.

The aircraft is also provided with a pair of forward airfoils 40 which are mounted on the nose of the body 10 and are adjustable through a range of positions including positions at which the two airfoils are completely retracted into the body. It is further contemplated that these forward airfoils 40 will be adjustable vertically through a range of angles relative to the body 10 as indicated by the dotted lines in Fig. 1.

The aircraft may be provided with various landing gear arrangements in various practices of the invention, it being contemplated that the landing gear will be carried solely by the body 10. The particular landing gear arrangement shown in Figs. 1 and 4 includes nose wheels 42 carried by a retractible structure 43. As viewed in Fig. 1, the retractible structure 43 moves downward and rearward from the body 10 with counterclockwise rotary movement. The rearward main truck of the landing gear includes a single central ground wheel 44 carried by a retractible structure 45 which moves downward and rearward with counterclockwise rotary movement in the same manner as the previously mentioned retractible structure 43. Pivotally mounted on the axle 46 of the ground wheel 44 is a rearwardly extending girder-like structure carrying a rearward pair of ground wheels 48. The pivoted structure 47 is carried by a retractible mechanism 49 that is pivotally connected thereto by trunnions 50.

The panels 35 and 38 of the wings 30 may be mounted and controlled, for example, in the manner illustrated by Figs. 5 and 6. Each of the forward panels 35 of the two wings 30 is mounted on a torque tube 54 that is journaled in suitable brackets 55 and the inner ends of these two torque tubes are connected by suitable universal joins 56 with the two ends of a central control shaft 57 that carries a control sheave 58. A pair of control cables 59, which are anchored to the periphery of the control sheave 58, extend forward over a pair of corresponding idler sheaves 60, the forward ends of the two cables being connected with suitable pilot-operated control means in a well known manner that need not be described. It is apparent that the two control cables 59 may be tensioned alternately for rotation of the torque tubes 54 in alternate directions with corresponding rotation of the wing panels 35 mounted thereon.

In like manner, the two trailing panels 38 of the two wings 30 may be mounted on corresponding torque tubes 61 which are journaled in suitable brackets 62 and connected by universal joints 63 with the opposite ends of a control shaft 64 inside the body 10. The control shaft 64 carries an operating arm 65 which may be oscillated in any suitable manner for actuation of the two torque tubes 61 to vary the angles of the trailing wing panels 38. If desired, the operating arm 65 may be connected by an adjustable connecting rod 66 with a similar arm 67 on the control shaft 57 for synchronized operation of the two panels 35 and 38. By virtue of this arrangement, upward tipping of the leading end of the forward control panel 35 will automatically cause the trailing panel 38 to swing downward thereby increasing the angle of attack and the drag of the wing.

The forward pair of airfoils 40 may be mounted in suitable openings in the skin of the body 10. Thus Fig. 1a indicates how each of the airfoils 40 may extend through a body opening 40b that is sized and shaped to accommodate the range of angles of incidence of the airfoil. Since the opening 40a is substantially larger than the cross section of the airfoil 40, the opening may be closed above and below the airfoil by any suitable closure that is yieldable to yield to the changes in angle of incidence of the airfoil. The airfoils 40 may be controlled, for example, in the manner illustrated diagrammatically by Figs. 7 and 8. In this construction, a centrol longitudinal housing 70 that is unitary with a motor 71, journals a longitudinal shaft 72 that is controlled by the motor. The shaft 72 is formed with a screw thread 73 which is engaged by a traveling nut 74. The housing 70 is journaled by a pair of lateral trunnions 75 in suitable bearings 76 to rock longitudinally about a transverse axis. The outer ends of the trunnions 75 are provided with clevis members 80 on which the two airfoils 40 are mounted by suitable pivots 81 for rotational adjustment about upright axes. Each of the airfoils 40 is connected to the traveling nut 74 by a suitable link 82 and it is apparent that the position of the traveling nut on the shaft 72 will determine the degree to which the two airfoils extend laterally into the air stream.

At the position of the traveling nut 74 shown in Fig. 7, the links 82 hold the two airfoils 40 at their positions of maximum lateral extension outside of the airplane body. When the motor 71 is energized to move the traveling nut leftward as viewed in Fig. 7, the links 82 progressively draw the two airfoils 40 inward until a limit position of the nut is reached that completely retracts the two airfoils into the airplane body. Preferably, end portions 83 of the two airfoils 40 extend beyond the two clevises 80 and these forwardly extended end portions are connected to the housing 70 by suitable springs 74. The two springs tend to swing the two airfoils 40 into the air stream and serve to balance, at least in part, the resistance to such movement that is afforded by the air stream.

For the purpose of controlling the angle of tilt of the two airfoils 40 relative to the airplane body 10, the longitudinal shaft 73 may be provided at its outer end with a pair of spaced collars 88 and a suitable sleeve 89 may be mounted rotatably on the shaft between the two collars. As shown in Fig. 8, the sleeve 89 is provided with a pair of ears 90 by means of which it is connected to a pair of control cables 91 and 92. The downwardly extending cable 91 passes around a guide sheave 93, makes contact with the periphery of a control quadrant 94 and terminates in a fitting 95 on the quadrant. In like manner, the upper cable 92 passes around three guide sheaves 96, 97 and 98 to contact the periphery of the control quadrant 94 from the opposite direction and terminates in a fitting 99 on the control quadrant. The control quadrant 94 is rotatably mounted on a suitable pivot 100 and has an operating arm 101 which is connected by a push-pull control rod 102 with pilot-operated control means in a well-known manner. It is apparent that longitudinal movement of the control rod 102 to the left, as viewed in Fig. 8, will swing the trailing ends of the two airfoils 40 downward and that rightward movement of the push-pull control rod will swing the trailing ends upward. As indicated in Fig. 8, the two airfoils 40 are movable through a range of angles above the horizontal for negative lift and through a range of angles below the horizontal for positive lift.

It will be readily apparent to those skilled in the art how the described aircraft meets the requirement for flexibility in the sense of being quickly adaptable to changing flight conditions, ranging from the one extreme of supersonic flight to the other extreme of take-off and landing. It will also be apparent how these requirements for various flight conditions are met with minimum burdening of one flight condition with a factor or with a physical component required primarily for another flight condition. How these objectives are attained may be appreciated by considering separately how drag is changed for the various flight conditions, how directional stability is provided in each flight condition, how maneuverability is maintained throughout the range of flight conditions, and how two modes of propulsion may be used selectively for effective use of power for the different flight conditions.

As for drag, it is apparent that with the two forward airfoils 40 completely retracted into the nose of the body 10 and with the two panels 35 and 38 of each of the wings 30 in longitudinal alignment with each other, the configuration of the aircraft is reduced essentially to that of a simple streamlined body having a pair of relatively thin swept-back wings of low aspect ratio. This combination offers minimum drag as required for supersonic flight.

The wings 30 are at the effective level of the longitudinal axis of the body and, more important, are on the rearwardly tapering portion of the body well behind the region 11 of maximum cross-sectional dimension of the body. This rearward positioning of the wings 30 with the long wing root that is characteristic of the low aspect wing form merging into the rapidly tapering aft section of the body in the smoothest manner possible is an important feature of the invention. Any interruption in the smoothness of a streamlined body's forward section greatly increases the turbulence of the air stream to the rear of the point of disturbance. Consequently, the further rearward the wing is positioned, the less will be the turbulent effect of the disturbance. Moreover, the further rearward the wing is positioned, the lesser the area of the "wetted surface" of the aircraft body in contact with the turbulent air stream, and therefore the less the drag of the wing-body combination.

While the provision of the upper and lower fins 33 and 34 on the wing tips may be regarded as more or less optional, they do reduce induced drag by preventing the formation of wing tip vortices. These surfaces need not be large.

At subsonic speeds where increase in control surface areas is desirable, the forward airfoils 40 are extended into the air stream to various degrees as may be desired, and are inclined to various angles for various aerodynamic effects. It is apparent since these forward airfoils are adjustable through angles for negative lift as well as through angles for positive lift, they serve the same purpose as elevators. It is to be noted, moreover, that with the wings 30 well rearward on the body 10, the airfoils 40 are spaced forward a relatively great distance from the wings, thus providing a certain leverage advantage which makes it practical to use forward airfoils of relatively small size.

With reference to minimum compromise among the requirements for the various flight conditions, it is to be noted that in supersonic flight, the aircraft is not handicapped by the presence of the usual tail and elevator structure that are ordinarily regarded as essential for the other flight conditions.

The provision of the forward airfoils 40 eliminates part of the usual tail structure by taking over the function of the usual elevators and the remaining tail structure is eliminated by providing the horizontal fins 13 in combination with the tunnel housing comprising the two cylindrical housing members 22 and 24. Thus the presence of the usual tail structure is avoided during supersonic flight, but nevertheless the function of the usual tail structure is provided for subsonic flight.

For takeoff when the airplane is picking up speed, relatively high lift combined with relatively low drag is required and therefore the main wings are adjusted with respect to the body for a relatively low angle of attack. On the other hand, for landing the airplane relatively high lift is required at lower forward speed and therefore the main wings are adjusted with respect to the body for a relatively high angle of attack.

The requirements for directional stability and longitudinal control under the different flight conditions are provided by the forward airfoils 40, the rearward vertical fins 12 and horizontal fins 13 and the adjacent root portions of the main wings on the body, the housing tunnel, and the vertical surfaces provided by the upper and lower fins 33 and 34 on the wing tips. It is also to be noted that the wing root's conjunction with the rearward tapered portion of the body, not only reduces turbulent drag, but also improves the directional flight characteristic of the aircraft. At supersonic speeds under jet propulsion, directional stability is attained by the cruciform cross-sectional configuration of the rearward tapering section of the body with the blast of air flowing in the corners of the cruciform section. At lower subsonic speeds, the propellers are cut in and function to pull the the air into the cruciform channels to provide the directionally stable air flow. In addition, the extension into the air stream of the forward airfoils 40 at subsonic speeds provides trim, stability and longitudinal control.

Maneuverability as required for the various flight conditions is inherent in the described structural provisions. At supersonic speeds, relatively small control surface variations or adjustments are required. At the lower speeds, the required increase in the area of control surfaces is provided simply by extending the forward airfoils 40 laterally into the air stream.

The requirement for effective propulsive power throughout the range of flight conditions is met by the provision for the selective use of jet propulsion and propeller propulsion. Preferably the dual drive shaft 21 is driven by a gas turbine through a clutch and reduction gearing. Thus the propellers may be "free wheeled" by the clutch when jet thrust above is desired. The gas turbine, of course, will provide jet thrust also when the propellers are in operation. At supersonic speeds, the propellers are feathered parallel with the air stream.

It will be noted that although the described aircraft meets the varied requirements of the different flight conditions with respect to drag, flight stability, maneuverability, and efficient propulsion, nevertheless the over-all construction is marked by structural simplicity. This structural simplicity is found in large part in the effectiveness of the cruciform of the rear section of the body in combination with the associated tunnel housing and also is in the concept of providing the forward retractible airfoils 40. Structural simplicity is further achieved by mounting the landing gear solely on the body of the aircraft without involving the wing structure. This placing of the load of the body directly on the landing gear makes it possible not only to reduce the weight of the wing structure, but also to simplify the landing gear mechanism.

One of the more important features of the described aircraft is in the provisions for promoting safety in making landings. Since both the forward pair of airfoils 40 and the wings 30 are rotatable relative to the body for increased angles of attack, it is not necessary to raise the nose of the body upward to a high angle in making a landing approach. Approaching a landing field at a high angle handicaps the pilot by reducing his field of vision and by imposing on him the burden of timing the return of the aircraft to normal landing position. With the present arrangement, the pilot maintains the aircraft at substantially level position and in landing varies the angles of attack of the forward airfoils 40 and of the panels of the wings 30. It is highly important to note also that only the relatively small airfoils 40 are in the forward field of observation by the pilot in making a landing. In making the landing, rotation of the forward airfoils and the rearward wing panels to angles of attack near stall provide maximum lift at low speed which both cushions the force of landing and the high drag of the wing in this altitude acts to brake the landing roll.

Of further importance with respect to landing is the relatively high positioning of the wings 30 at the level of the body axis. The elevation of the wings gives greater ground clearance than is usual, and lessens the likelihood of damage to the wings by contact with the surface objects and by stones and gravel thrown upward by the wheels in making landing contact.

A further important feature of the aircraft with respect to landing is the "fail-safe" arrangement of the landing gear. As heretofore pointed out, the landing gear makes its extension movement with counterclockwise rotation as viewed in Fig. 1, so that both gravity and air drag tend to cause the landing gear to swing down to its fully extended position. Thus, the landing gear may be extended in an emergency without the application of power and without the necessity of overcoming either gravity or air resistance.

It will be apparent to those skilled in the art that my description in detail of a selected embodiment of the invention suggests various changes, substitutions and other departures from my disclosure that properly lie within the spirt and scope of the appended claims.

I claim:

1. An airborne vehicle having: a streamlined body tapering forward and rearward from a region of maximum cross-sectional area; main lifting members mounted on said body rearward of said region and a forward pair of relatively small laterally extending airfoils independent of said main lifting members mounted on said body near the leading end thereof; said forward airfoils being retractible into said body to various degrees to vary the effective areas of the airfoil by varying the portions of the lifting surfaces thereof exposed to the air stream.

2. An airborne vehicle as set forth in claim 1 in which said forward airfoils are variable to various degrees of incidence relative to said body at various degrees of extension of the airfoils.

3. An airborne vehicle as set forth in claim 2 in which said forward airfoils are variable through angles for negative lift as well as angles for positive lift.

4. An airborne vehicle as set forth in claim 1 in which said main wings are variable in angle of attack with reference to the longitudinal axis of the body of the vehicle.

5. An airborne vehicle having: a streamlined body tapering forward and rearward from a region of maximum cross-sectional area; a pair of main wings mounted on said body rearward of said region, said main wings being adjustable relative to said body for different angles of incidence relative to the longitudinal axis of the body; control means to change the angle of incidence of said main wings during flight; a forward pair of airfoils mounted on opposite sides of said body near the leading end thereof, said forward airfoils being variably retractible into the interior of said body; and control means to vary the retraction of said forward airfoils into the body in the course of flight.

6. An airborne vehicle as set forth in claim 5 in which said forward airfoils are not only variably retractible into the body but are also variable in angle of incidence relative to the body at different degrees of retraction; and which includes control means to vary the inclination of said forward airfoils in the course of flight.

7. An airborne vehicle as set forth in claim 5 in which each of said main wings has a variably inclined main panel and a variably inclined trailing panel.

8. An airborne vehicle as set forth in claim 7 in which said panels of each wing are operatively interconnected for simultaneous inclination of both panels.

9. An airborne vehicle having: a streamlined body tapering forward and rearward from a region of maximum cross-sectional area, the rearwardly tapering portion of said body having upper and lower vertical fin portions and lateral horizontal fin portions on opposite sides to provide a cruciform cross-sectional configuration; power driven propeller means immediately rearward of said cruciform shaped section of the body; a tunnel housing surrounding said propeller means to draw the air stream impelled by the propeller into contact with the surfaces of said cruciform-shaped section of the body; a pair of main wings mounted on said body rearward from said region of maximum cross-sectional area; and a forward pair of airfoils mounted on opposite sides of said body near the leading end thereof, said airfoils being at least partially retractible into the body independently of said main wings to vary the effective areas of the airfoils by varying the portions of the lifting surfaces thereof exposed to the air stream.

10. An airborne vehicle as set forth in claim 9 in which said main wings are adjustable relative to the longitudinal axis of said body for different angles of incidence.

11. An airborne vehicle as set forth in claim 10 in which said forward airfoils are adjustable to negative angles of lift as well as positive angles of lift.

References Cited in the file of this patent

UNITED STATES PATENTS

| Number | Name | Date |
| --- | --- | --- |
| 1,523,671 | Tanner | Jan. 20, 1925 |
| 1,590,880 | Broquist | June 29, 1926 |
| 1,813,485 | Cook | July 7, 1931 |
| 1,981,856 | Downey | Nov. 27, 1934 |
| 2,308,796 | Dornier | Jan. 19, 1943 |
| 2,421,694 | Hawkins | June 3, 1947 |
| 2,470,602 | Campbell | May 17, 1949 |
| 2,504,137 | Lewis | Apr. 18, 1950 |
| 2,526,941 | Fishbein | Oct. 24, 1950 |
| 2,532,755 | Bloomfield | Dec. 5, 1950 |
| 2,596,436 | Robert | May 13, 1952 |

(Other references on following page)

UNITED STATES PATENTS

| | | |
|---|---|---|
| 2,601,962 | Douglas | July 1, 1952 |
| 2,650,047 | Carhart | Aug. 28, 1953 |
| 2,744,698 | Baynes | May 8, 1956 |
| 2,747,816 | Howard | May 29, 1956 |

FOREIGN PATENTS

| | | |
|---|---|---|
| 374,737 | France | Apr. 25, 1907 |
| 573,411 | France | Mar. 10, 1924 |
| 628,047 | Great Britain | Aug. 22, 1949 |
| 986,603 | France | Apr. 4, 1951 |
| 1,007,694 | France | Feb. 13, 1952 |
| 1,015,450 | France | July 23, 1952 |

OTHER REFERENCES

N.A.C.A. Technical Note 2018, February 1950, page 7.